UNITED STATES PATENT OFFICE.

JAMES M. JENNINGS, OF ELIZABETH, NEW JERSEY, ASSIGNOR TO STANDARD OIL COMPANY, OF BAYONNE, NEW JERSEY, A CORPORATION OF NEW JERSEY.

STABLE FOAM FOR PREVENTING THE EVAPORATION OF STORED LIQUIDS.

1,423,719.     Specification of Letters Patent.     Patented July 25, 1922.

No Drawing.     Application filed November 22, 1920. Serial No. 425,848.

*To all whom it may concern:*

Be it known that I, JAMES M. JENNINGS, a citizen of the United States, residing at 907 Colonial Road, Elizabeth, in the county of Union and State of New Jersey, have invented a new and useful Improvement in a Stable Foam for Preventing the Evaporation of Stored Liquids, of which the following is a specification.

The present invention relates to foams and foam producing liquids and more particularly to foams intended to be floated upon the surfaces of liquids containing volatile constituents, for example, crude petroleum, for preventing evaporation thereof and liquids suitable for the production of such foams. The invention will be fully understood from the following description thereof, in which a specific illustration of the composition of the foam producing liquid is given in detail.

In accordance with the present invention the foam producing liquid is prepared by the solution in water of glue or gelatine, together with glycerine, a suitable preservative if desired and likewise certain inorganic salts which increase the stability and improve the setting of the foam, when desired.

The proportion of glue present in the foam-forming liquid may vary from 10 to 30% and of glycerine from 2 to 15%, the lower proportions of glycerine being used with the lower proportions of glue. As a preservative a minute proportion of mercuric chloride may be employed, for example, 0.05 to 0.1%. The stability and permanency of the foam may be increased and its setting properties improved by the addition thereto of suitable proportions of salts of the iron group of compounds, namely, iron, nickel, and cobalt, and particularly the -ous sulphates of these metals. The proportion of such inorganic salts added should be less than 5% and is preferably from 1 to 2%. As examples of such salts ferric chloride, ferric or ferrous sulfate, nickelous sulfate or cobaltous sulfate may be employed. Certain other materials may be added to the foam producing liquid, for example, up to 6% of sodium sludge sulfonates, or a small proportion of salt such as is contained in sea water without deleteriously affecting the quality of the foam produced. The following example illustrates a preferred method of preparing a liquid for the production of a suitable foam for the purpose described.

One tenth per cent of mercuric chloride is dissolved in a part of the water required for the liquid. 25% of a good glue, for example pattern makers glue is then added to the solution and, after a short period of soaking to swell the glue, is dissolved by heating the liquid and stirring. Two per cent of ferrous sulfate, preferably preliminarily dissolved in a part of the water, is then added and finally the glycerine is poured in. The volume of the liquid is then made up to the required amount with water and the solution thoroughly mixed by stirring. The temperature of the liquid is maintained above its setting point, which in the present instance is about 112° F. The liquid, while being maintained above this temperature, is whipped into a foam, preferably by mechanically beating the liquid while introducing air or gas in finely divided particles thereinto from below, one volume of the liquid producing 1.8 volume of foam. The foam may be produced in the manner described in the prior application of myself and another Serial No. 373,455, filed April 12, 1920, and may be distributed upon the surface of crude petroleum, in a storage tank in the manner described in that application or in the prior application of myself with others, Serial No. 373,454, filed April 12, 1920. The foam produced from this solution has a high degree of permanency, does not buckle, sets rapidly when distributed over the liquid which it is intended to cover, does not evaporate or dry out readily and has a great degree of flexibility and pliability.

Although the present invention has been described in connection with the details of a specific example thereof, it is not intended that these details shall be regarded as limitations upon the scope of the invention except in so far as included in the accompanying claims.

I claim:

1. A stable foam for preventing evaporation of volatile constituents of a liquid having as its base an aqueous solution containing 25% of glue, 10% of glycerine, 2% of ferrous sulfate, and a minute proportion of a preservative.

2. A foam forming liquid comprising water, 25% of glue, 10% of glycerine, 2% ferrous sulfate and a minute proportion of a preservative.

3. A liquid for the production of foam intended to be floated upon a liquid containing volatile components to prevent evaporation thereof, comprising 10 to 30% of glue and from 2 to 15% of glycerine together with water, the lower proportions of glycerine being used with the lower proportions of glue.

4. A liquid for the production of foam intended to be floated upon a liquid containing volatile components to prevent evaporation thereof, containing from 10 to 30% of glue, from 2 to 15% of glycerine, less than 5% of the -ous sulfate of a metal of the iron group and water.

5. A liquid for the production of foam intended to be floated upon a liquid containing volatile components to prevent evaporation thereof, containing from 10 to 30% of glue, from 2 to 15% of glycerine, less than 5% of ferrous sulfate and water.

6. A liquid for the production of foam intended to be floated upon a liquid containing volatile components to prevent evaporation thereof, containing from 10 to 30% of glue, from 2 to 15% of glycerine, less than 5% of an iron salt and water.

7. A liquid for the production of foam intended to be floated upon a liquid containing volatile components to prevent evaporation thereof, containing from 10 to 30% of glue, from 2 to 15% of glycerine, 1 to 2% of ferrous sulfate, water and a preservative.

8. A stable foam for preventing the evaporation of volatile constituents of the liquid and having as its base an aqueous solution containing 10 to 30% of glue, 2 to 15% of glycerine, and less than 5% of an -ous sulfate of a metal of the iron group.

9. A stable foam for preventing the evaporation of volatile constituents of a liquid having as its base an aqueous solution containing 10 to 30% of glue, 2 to 15% of glycerine, 1 to 2% of ferrous sulfate and a preservative.

JAMES M. JENNINGS.